(12) United States Patent
Ballantine et al.

(10) Patent No.: US 12,388,295 B2
(45) Date of Patent: Aug. 12, 2025

(54) POWER SOURCE COMMUNICATION WITH DOWNSTREAM DEVICE BY CHANGING OUTPUT VOLTAGE ON A POWER BUS

(71) Applicants: BLOOM ENERGY CORPORATION, San Jose, CA (US); POWERSECURE, INC., Wake Forest, NC (US)

(72) Inventors: Arne Ballantine, Palo Alto, CA (US); Prasad Pmsvvsv, Sunnyvale, CA (US); Rajesh Gopinath, Sunnyvale, CA (US); Ranganathan Gurunathan, Bangalore (IN); Robert Harris, Mebane, NC (US); Marshall Worth, Raleigh, NC (US); Chaitanya Mandela, Bangalore (IN); Vishal Anand Gopalakrishnan, Bangalore (IN)

(73) Assignees: BLOOM ENERGY CORPORATION, San Jose, CA (US); POWERSECURE INCORPORATED, Wake Forest, NC (US)

( * ) Notice: Subject to any disclaimer, the term of this patent is extended or adjusted under 35 U.S.C. 154(b) by 299 days.

(21) Appl. No.: 18/304,807

(22) Filed: Apr. 21, 2023

(65) Prior Publication Data

US 2023/0261519 A1 Aug. 17, 2023

Related U.S. Application Data

(62) Division of application No. 16/555,252, filed on Aug. 29, 2019, now Pat. No. 11,916,378.

(Continued)

(51) Int. Cl.
*H01M 8/04* (2016.01)
*H01M 8/04858* (2016.01)
(Continued)

(52) U.S. Cl.
CPC ..... *H02J 13/0001* (2020.01); *H01M 8/04873* (2013.01); *H01M 8/04932* (2013.01);
(Continued)

(58) Field of Classification Search
CPC ...... H01M 8/04; H01M 8/048; H01M 8/0458; H01M 8/10; H01M 8/0466
See application file for complete search history.

(56) References Cited

U.S. PATENT DOCUMENTS

| 8,970,176 B2 | 3/2015 | Ballantine et al. |
| 9,106,098 B2 | 8/2015 | Srinivasan et al. |

(Continued)

FOREIGN PATENT DOCUMENTS

| EP | 2793345 | 11/2016 |
| KR | 10-0497834 | 6/2005 |

OTHER PUBLICATIONS

IPRP—Notification Concerning Transmittal of International Preliminary Report on Patentability and Written Opinion of the International Search Authority for International Patent Application No. PCT/US2019/048767, mailed Mar. 11, 2021, 15 pages.

(Continued)

*Primary Examiner* — Kenneth J Douyette
(74) *Attorney, Agent, or Firm* — THE MARBURY LAW GROUP PLLC

(57) ABSTRACT

A power generation system includes a power source that is configured to communicate with at least one of a downstream load or a downstream device by changing a voltage on a power bus between the power source and the at least one of the downstream load or the downstream device, while power source provides power on the power bus to the at least one of the downstream load or the downstream device.

4 Claims, 9 Drawing Sheets

Related U.S. Application Data

(60) Provisional application No. 62/724,706, filed on Aug. 30, 2018.

(51) Int. Cl.

| | | |
|---|---|---|
| *H01M 8/10* | (2016.01) | |
| *H02J 3/38* | (2006.01) | |
| *H02J 9/06* | (2006.01) | |
| *H02J 13/00* | (2006.01) | |
| *H01M 8/12* | (2016.01) | |

(52) U.S. Cl.
 CPC ............... *H01M 8/10* (2013.01); *H02J 3/38* (2013.01); *H02J 9/06* (2013.01); *H02J 13/00* (2013.01); *H01M 2008/1293* (2013.01); *H02J 2300/30* (2020.01)

(56) References Cited

U.S. PATENT DOCUMENTS

| | | |
|---|---|---|
| 9,214,812 B2 | 12/2015 | Ballantine et al. |
| 9,362,815 B2 | 6/2016 | Gurunathan et al. |
| 9,461,320 B2 | 10/2016 | Ballantine et al. |
| 9,639,130 B2 | 5/2017 | Gurunathan et al. |
| 9,698,598 B2 | 7/2017 | Ballantine et al. |
| 10,367,215 B2 | 7/2019 | Pmsvvsv et al. |
| 10,873,099 B1 | 12/2020 | Gurunathan et al. |
| 2006/0194082 A1 | 8/2006 | Tucker et al. |
| 2012/0098336 A1 | 4/2012 | Gurunathan et al. |
| 2012/0146587 A1 | 6/2012 | Srinivasan et al. |
| 2012/0267952 A1 | 10/2012 | Ballantine et al. |
| 2012/0326504 A1 | 12/2012 | Ballantine et al. |
| 2012/0326668 A1 | 12/2012 | Ballantine et al. |
| 2013/0183599 A1 | 7/2013 | Otsuka et al. |
| 2013/0320910 A1 | 12/2013 | Reiser |
| 2015/0228990 A1 | 8/2015 | Ballantine et al. |
| 2015/0288220 A1 | 10/2015 | Gurunathan et al. |
| 2017/0005480 A1 | 1/2017 | Ballantine et al. |
| 2017/0077535 A1 | 3/2017 | Sudhan S et al. |
| 2017/0338502 A1 | 11/2017 | Pmsvvsv et al. |
| 2020/0076200 A1 | 3/2020 | Ballantine et al. |

OTHER PUBLICATIONS

ISR-WO—International Search Report and Written Opinion of the International Searching Authority for International Patent Application No. PCT/US2019/048767, mailed Dec. 12, 2019, 15 pages.

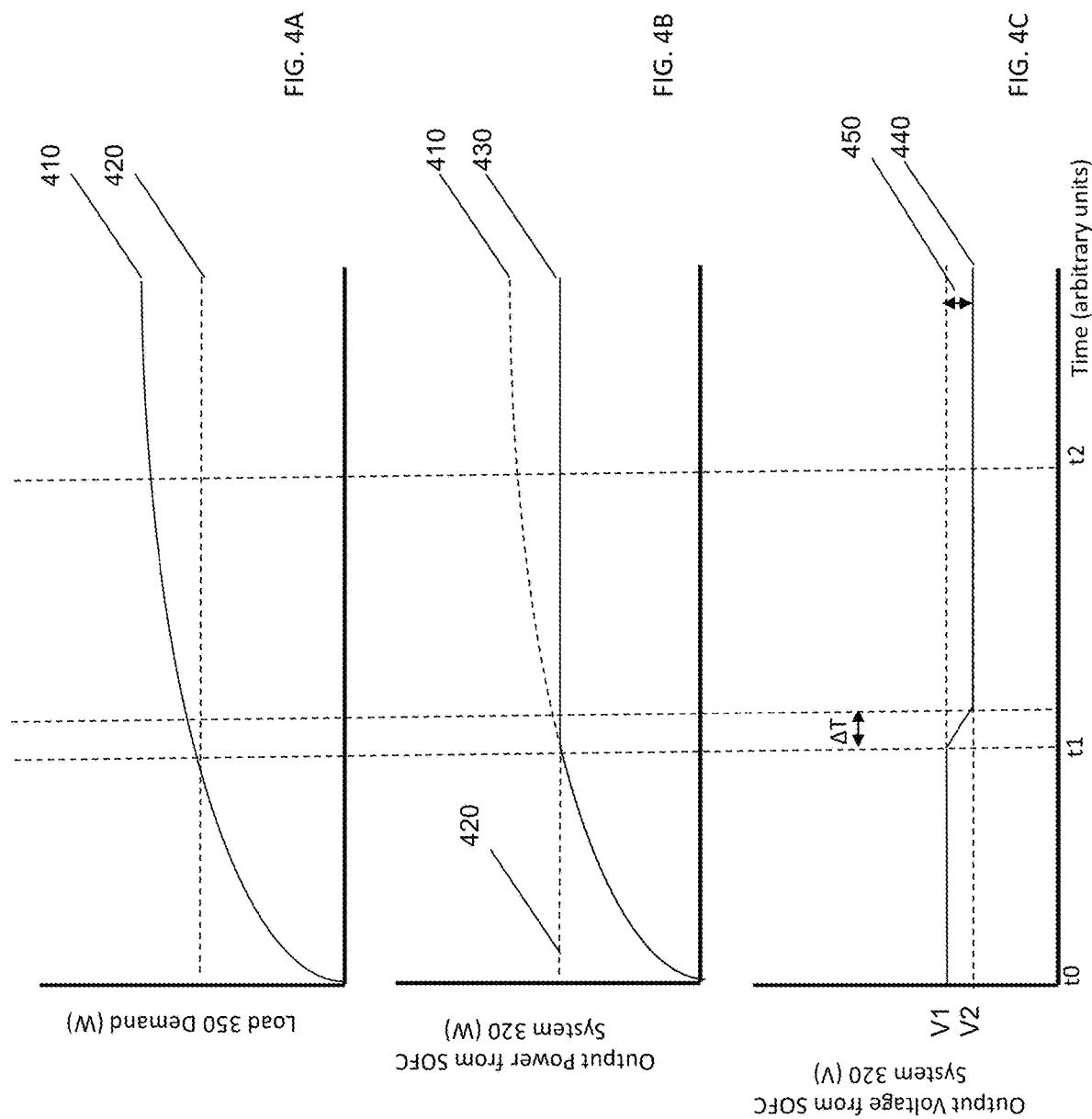

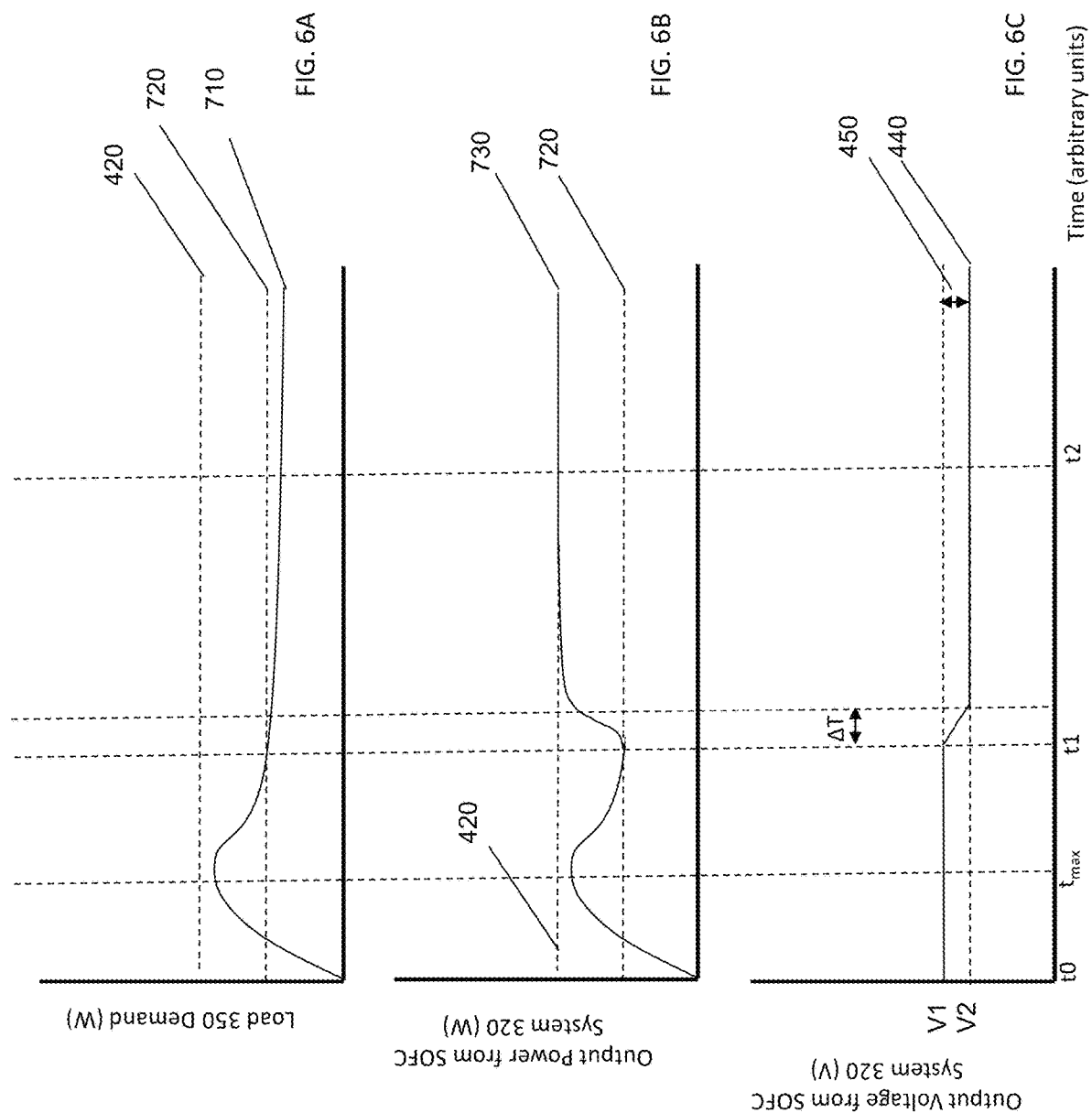

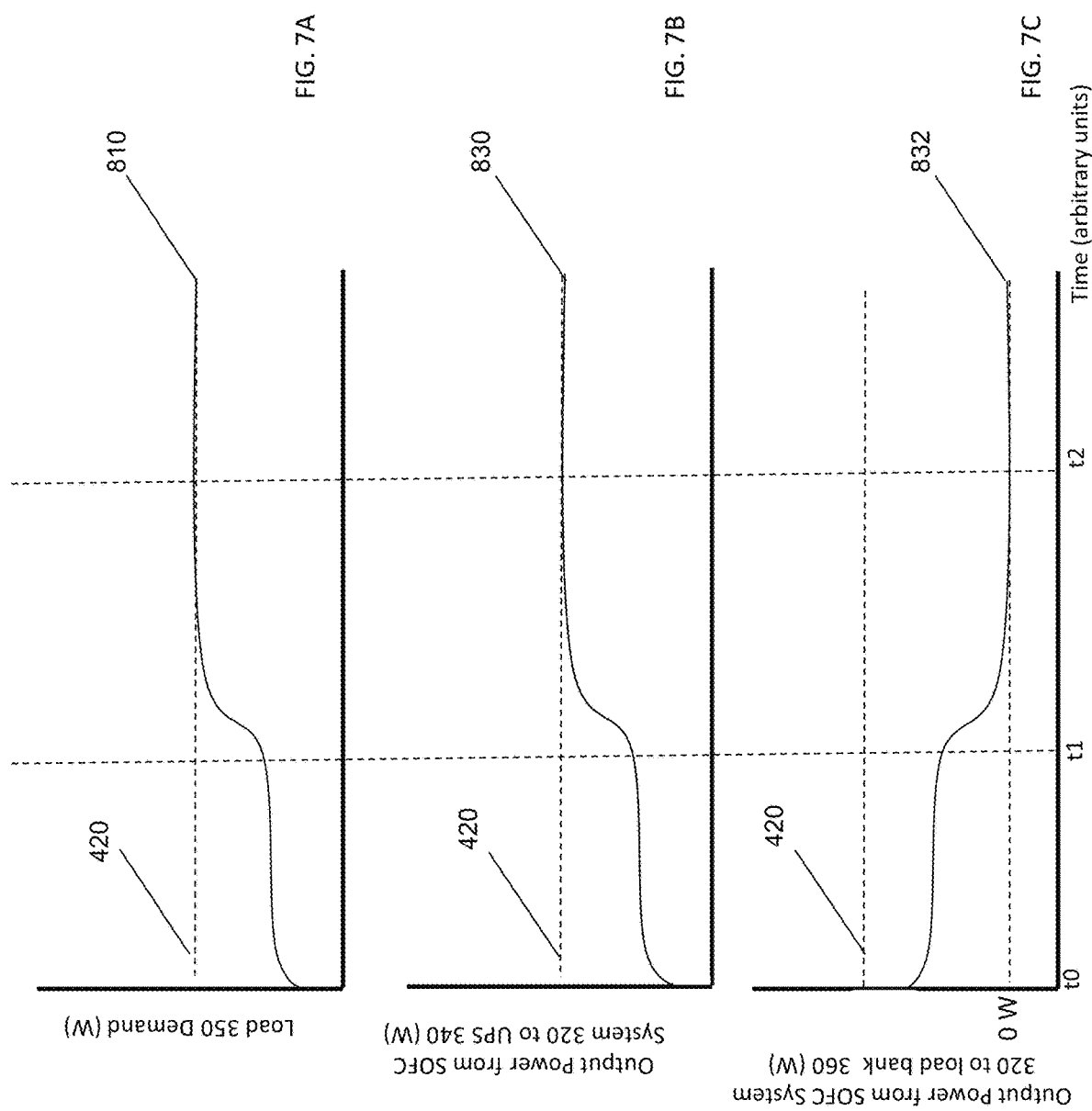

POWER SOURCE COMMUNICATION WITH DOWNSTREAM DEVICE BY CHANGING OUTPUT VOLTAGE ON A POWER BUS

FIELD

The present invention is generally directed to power generation systems and, in particular, to a fuel cell system that communicates with downstream devices using an output voltage droop on a power bus.

BACKGROUND

Electrochemical devices, such as fuel cells, can convert energy stored in fuels to electrical energy with high efficiencies. In a fuel cell system, such as a solid oxide fuel cell (SOFC) system, an oxidizing flow is passed through the cathode side of the fuel cell while a fuel inlet flow is passed through the anode side of the fuel cell. The oxidizing flow is typically air, while the fuel flow can be a hydrocarbon fuel, such as methane, natural gas, pentane, ethanol, or methanol. The fuel cell enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

SOFC systems may be used to power many different devices under many different arrangements. The variety of potential applications creates a need for an SOFC system and control method that can be readily adapted for use with different kinds of systems using different control hardware and software.

SUMMARY

An embodiment includes a power generation system, comprising a power source that is configured to communicate with at least one of a downstream load or a downstream device by changing a voltage on a power bus between the power source and the at least one of the downstream load or the downstream device, while power source provides power on the power bus to the at least one of the downstream load or the downstream device.

An embodiment includes method of operating a power source, comprising providing output power on a power bus from a power source to at least one of a load or a device, and changing an output voltage of the power source on the power bus for the power source to communicate with the at least one of the load and the device while the power source provides the output power on the power bus.

Another embodiment includes a method of operating a power source, comprising providing output power from a power source to a load to track and meet a power demand of the load, and directing excess output power from the power source to an additional load to maintain the output power of the power source above a minimum desired operating power of the power source when the power demand from the load drops to less than the minimum desired operating power of the power source.

BRIEF DESCRIPTION OF THE DRAWINGS

FIGS. 4A-4D show temporal plots of certain aspects of the system of FIG. 3A in operation according to an embodiment.

FIGS. 6A-6C show temporal plots of certain aspects of the system of FIG. 3A in operation according to an embodiment.

FIGS. 7A-7C show temporal plots of another aspect of the system of FIG. 3A in operation according to another embodiment.

DETAILED DESCRIPTION

The present inventors realized that one way to address expanding the compatibility and applicability of power sources, such as SOFC systems, is by developing control methods/systems that are compatible with different loads or devices. In particular, the present inventors realized that signaling those loads or devices regarding output power of the power source without relying on specific protocols or control hardware in the loads or devices would be advantageous.

Embodiments include a power source that communicates with the downstream load and/or device by changing voltage on power bus between the power source and the load and/or device, while power source provides power on the power bus to the load and/or device.

In one embodiment, the power source may be a DC power source, such as a fuel cell system, a photovoltaic system, a thermoelectric system, etc. The power bus may be a DC power bus. The load may be a microgrid. The device may be an inverter containing device, such as an uninterruptible power system (UPS) (also referred to as an uninterruptible power module). The communication may be carried between separate power source controller and inverter controller which do not have a separate communication link or protocol between them.

For example, in one embodiment output power is provided from the power source to the load to track and meet a power demand of the load. In response to an increased power demand from the load, the power source controller determines if the requested increase in output power of the power source would cause the output power of the power source to exceed a threshold output power. If the output power of the power source would exceed the threshold output power, then the power source controller signals to the inverter controller that the threshold output power would be exceeded by changing (e.g., drooping) an output voltage of the power source, and does not increase the output power above the threshold output power such that the output power no longer tracks the power demand of the load. If the output power of the power source would not exceed the threshold output power, then the power source controller increases the output power from the power source to meet the power demand of the load.

In another embodiment, when the load power demand drops to less than a minimum desired power output of the power source, such as solid oxide fuel cell system, then power is directed to an additional, non-critical load, such as a resistive load bank and/or an energy storage device, such as a battery or supercapacitor. The power directed to the additional load may be equal to a difference between the minimum desired operating power and the load power demand.

Figure 1:
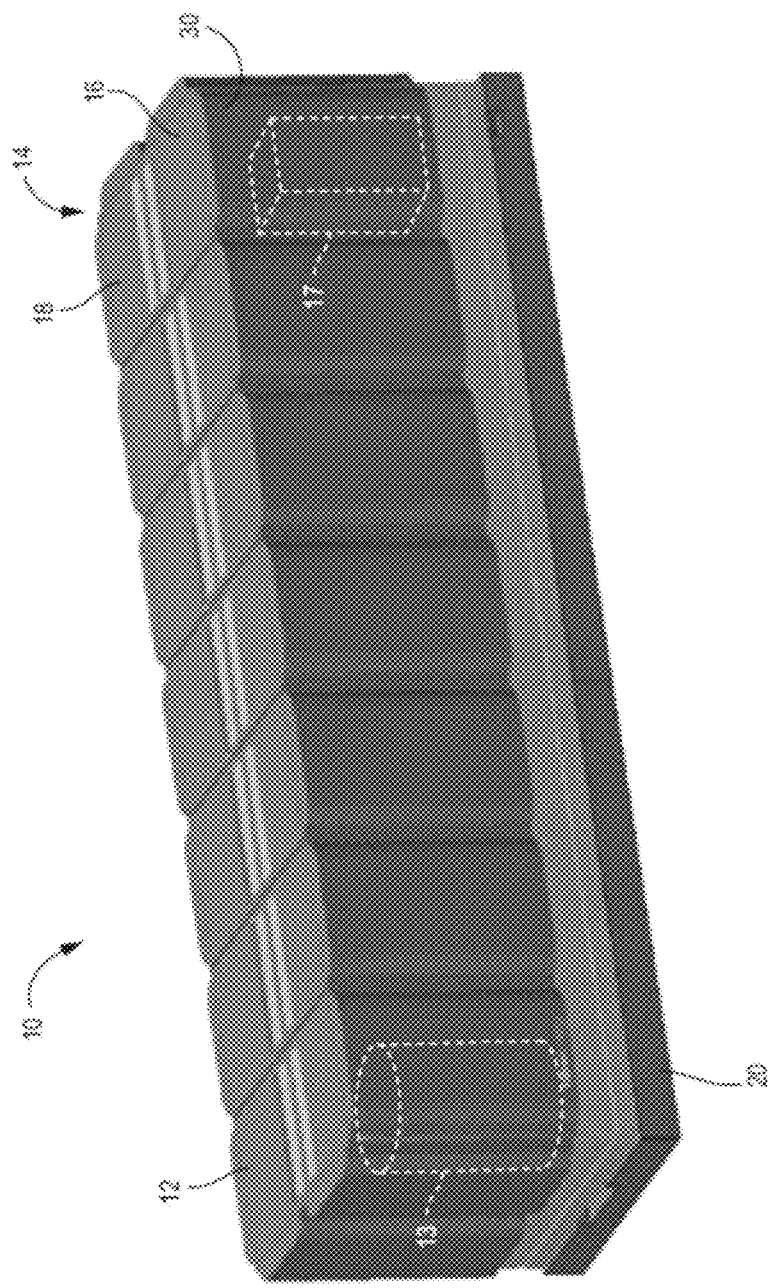
FIG. 1 is a perspective view of a fuel cell system according to embodiments.

FIG. 1 illustrates an exemplary modular fuel cell system described in U.S. Pat. No. 8,440,362, incorporated herein by reference in their entirety. The modular system may contain modules and components described above as well as in U.S. patent application Ser. No. 11/656,006, filed on Jan. 22, 2007, and entitled "Modular Fuel Cell System" which is incorporated herein by reference in its entirety. The modular design of the fuel cell system enclosure 10 provides flexible system installation and operation.

The modular fuel cell system enclosure 10 includes a plurality of power module housings 12 (containing a fuel cell power module components), one or more fuel input (i.e., fuel processing) module housings 16, and one or more power conditioning (i.e., electrical output) module housings 18. For example, the system enclosure may include any desired number of modules, such as 2-30 power modules, for example 6-12 power modules. FIG. 1 illustrates a system enclosure 10 containing six power modules (one row of six modules stacked side to side), one fuel processing module, and one power conditioning module, on a common base 20. Each module may comprise its own cabinet or housing. Alternatively, the power conditioning and fuel processing modules may be combined into a single input/output module located in one cabinet or housing 14. For brevity, each housing 12, 14, 16, 18 will be referred to as "module" below.

While one row of power modules 12 is shown, the system may comprise more than one row of modules 12. For example, the system may comprise two rows of power modules stacked back to back.

Each power module 12 is configured to house one or more hot boxes 13. Each hot box contains one or more stacks or columns of fuel cells (not shown for clarity), such as one or more stacks or columns of solid oxide fuel cells having a ceramic oxide electrolyte separated by conductive interconnect plates. Other fuel cell types, such as PEM, molten carbonate, phosphoric acid, etc. may also be used.

The modular fuel cell system enclosure 10 also contains one or more input or fuel processing modules 16. This module 16 includes a cabinet which contains the components used for pre-processing of fuel, such as desulfurizer beds. The fuel processing modules 16 may be designed to process different types of fuel. For example, a diesel fuel processing module, a natural gas fuel processing module, and an ethanol fuel processing module may be provided in the same or in separate cabinets. A different bed composition tailored for a particular fuel may be provided in each module. The processing module(s) 16 may processes at least one of the following fuels selected from natural gas provided from a pipeline, compressed natural gas, methane, propane, liquid petroleum gas, gasoline, diesel, home heating oil, kerosene, JP-5, JP-8, aviation fuel, hydrogen, ammonia, ethanol, methanol, syn-gas, bio-gas, bio-diesel and other suitable hydrocarbon or hydrogen containing fuels. If desired, a reformer 17 may be located in the fuel processing module 16. Alternatively, if it is desirable to thermally integrate the reformer 17 with the fuel cell stack(s), then a separate reformer 17 may be located in each hot box 13 in a respective power module 12. Furthermore, if internally reforming fuel cells are used, then an external reformer 17 may be omitted entirely.

The modular fuel cell system enclosure 10 also contains one or more power conditioning modules 18. The power conditioning module 18 includes a cabinet which contains the components for converting the fuel cell stack generated DC power to AC power, electrical connectors for AC power output to the grid, circuits for managing electrical transients, a system controller (e.g., a computer or dedicated control logic device or circuit). The power conditioning module 18 may be designed to convert DC power from the fuel cell modules to different AC voltages and frequencies. Designs for 208V, 60 Hz; 480V, 60 Hz; 415V, 50 Hz and other common voltages and frequencies may be provided.

The fuel processing module 16 and the power conditioning module 18 may be housed in one input/output cabinet 14. If a single input/output cabinet 14 is provided, then modules 16 and 18 may be located vertically (e.g., power conditioning module 18 components above the fuel processing module 16 desulfurizer canisters/beds) or side by side in the cabinet 14.

As shown in one exemplary embodiment in FIG. 1 one input/output cabinet 14 is provided for one row of six power modules 12, which are arranged linearly side to side on one side of the input/output module 14. The row of modules may be positioned, for example, adjacent to a building for which the system provides power (e.g., with the backs of the cabinets of the modules facing the building wall). While one row of power modules 12 is shown, the system may comprise more than one row of modules 12. For example, as noted above, the system may comprise two rows of power modules stacked back to back.

Each of the power modules 12 and input/output modules 14 include a door 30 (e.g., hatch, access panel, etc.) to allow the internal components of the module to be accessed (e.g., for maintenance, repair, replacement, etc.). According to one embodiment, the modules 12 and 14 are arranged in a linear array that has doors 30 only on one face of each cabinet, allowing a continuous row of systems to be installed abutted against each other at the ends. In this way, the size and capacity of the fuel cell enclosure 10 can be adjusted with additional modules 12 or 14 and bases 20 with minimal rearranging needed for existing modules 12 and 14 and bases 20. If desired, the door 30 to module 14 may be on the side rather than on the front of the cabinet.

Figure 2:
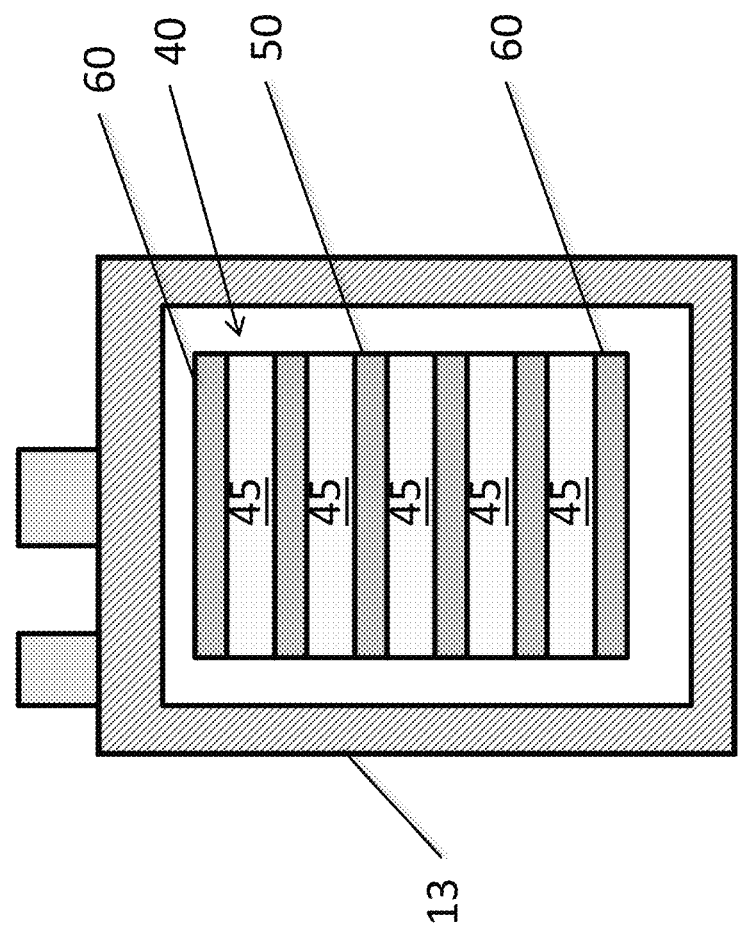
FIG. 2 is a schematic side cross-sectional view of a hot box according to embodiments.

FIG. 2 illustrates a plan view of a fuel cell system hotbox 13 including a fuel cell stack or column 40. The hotbox 13 is shown to include the fuel cell stack or column 40. However, the hotbox 13 may include two or more of the stacks or columns 40. The stack or column 40 may include the electrically connected fuel cells 45 stacked on one another, with the interconnects 50 disposed between the fuel cells 45. The first and last fuel cells 45 in the stack or column are disposed between an respective end plate 60 and interconnect 50. The end plates 60 are electrically connected to electrical outputs of the fuel cell stack or column 40. The hotbox 13 may include other components, such as fuel conduits, air conduits, seals, electrical contacts, etc, and may be incorporated into a fuel cell system including balance of plant components. The fuel cells 45 may be solid oxide fuel cells containing a ceramic electrolyte, such as yttria stabilized zirconia (YSZ) or scandia stabilized zirconia (SSZ), an anode electrode, such as a nickel-YSZ, a Ni-SSZ or a nickel-samaria doped ceria (SDC) cermet, and a cathode electrode, such as lanthanum strontium manganite (LSM)). The interconnects 50 and/or end plates 60 may comprise any suitable gas impermeable and electrically conductive material, such as a chromium—iron alloy, such as an alloy containing 4 to 6 wt % iron and balance chromium. The interconnects 50 electrically connect adjacent fuel cells 45 and provide channels for fuel and air to reach the fuel cells 45.

Figure 3A:
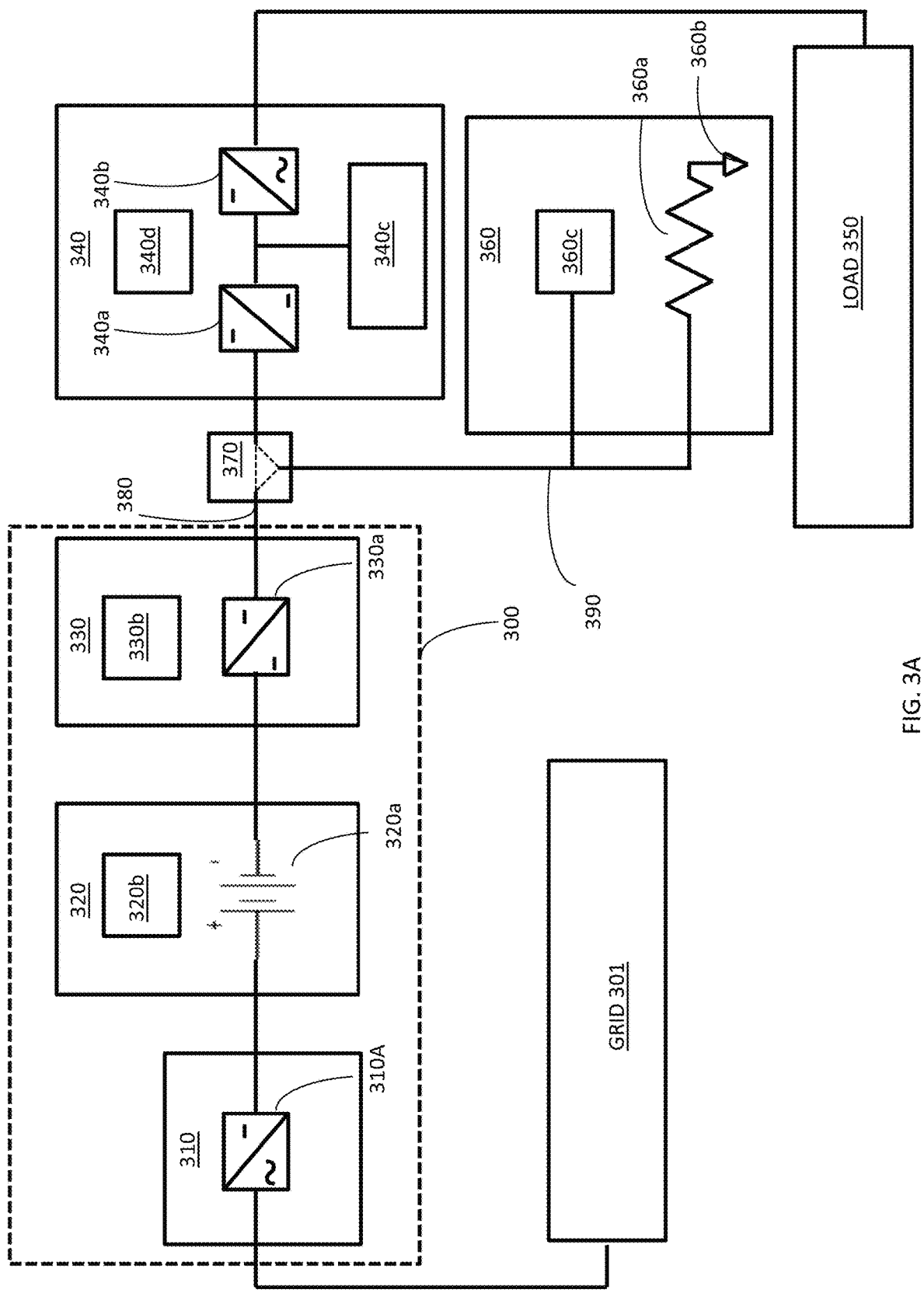
FIG. 3A is a schematic diagram of a system according to embodiments.

FIG. 3A shows a fuel cell power generation system 300 according to embodiments. As shown in FIG. 3A, the system 300 may include an Input/Output Module (IOM) 310, a fuel cell system 320, and an Auxiliary Output Module (AOM) 330. The system 300 may be electrically connected to an uninterruptible power system (UPS) 340, a load 350, and a Resistive Load Bank (RLB) 360 through an optional multi-way switch 370. A DC power bus 380 connects the SOFC system 320 to the UPS 340 through the switch 370. An auxiliary DC power bus 390 connects the RLB 360 through the switch 370 to the DC power bus (or to the UPS 340). However, it is to be understood that embodiments described herein do not require every one of components 310-390.

IOM 310 may connect SOFC system 320 to the power grid 301. IOM 310 can include inverter 310A, as shown FIG. 3A, for converting a DC output from SOFC system 320 to AC for use by the power grid 301. IOM 310 can also include other suitable components (not shown) including, but not limited to, controllers, resistive load banks, circuit breakers, and relays. It is to be understood that IOM 310 is optional, as is connecting the fuel cell system 320 the grid 301. It is to be further understood that the features or components of IOM 310 may be incorporated into other components, such as fuel cell system 320.

The fuel cell system 320 is shown in FIG. 3A to include a generalized power source 320a for the sake of convenience. The fuel cell system 320 and/or power source 320a may include, for example, the SOFC system shown in FIG. 1 which contains the hot box 13 shown in FIGS. 1 and 2. For sake of brevity, the fuel cell system 320 is referred to below as a "SOFC system 320". However, it should be understood that the fuel cell system 320 may include other types of fuel cells, such as PEM fuel cells, molten carbonate fuel cells, etc. The SOFC system 320 may also include a number of other suitable components (not shown), such as energy storage devices (e.g., batteries or supercapacitors), fuel valves, fuel and air blowers, circuit breakers, temperature gauges, etc.

SOFC system 320 may include a controller 320b as shown in FIG. 3A. Controller 320b may include any suitable logic that can control certain aspects of SOFC system 320 and/or power source 320a. For example, controller 320b may control the fuel flow rate into the SOFC system, the output voltage from the SOFC system, air flow rate into the SOFC system, and fuel recycling rate in the SOFC system, etc. For example, the controller 320b may control the output voltage and/or power of SOFC system 320 to other components of the system 300, such as to IOM 310 and/or AOM 330. In addition, controller 320b may communicate, either directly or indirectly, with other components in the system 300 and/or with remote control terminals. As discussed in more detail below, controller 320b can allow SOFC system 320 to indirectly communicate with other components, such as the UPS 340, by drooping the output voltage of the SOFC system 320.

AOM 330 may include a DC/DC converter 330a for providing DC voltage output from the SOFC system 320 at a higher and/or lower voltage compatible with the UPS 340. Also, as shown in FIG. 3A, one output of the AOM 330 may go to RLB 360. Although FIG. 3A shows a single connection between AOM 330 and both UPS 340 and RLB 360, it is to be understood that each of UPS 340 and RLB 360 may be connected separately to SOFC system 320. As shown in FIG. 3A, AOM 330 may also include a controller 330b. Controller 330b may be similar to controller 320b, as described above in the context of SOFC system 320, and may perform some similar functions as controller 320b, as appropriate for AOM 330. Alternatively, a single controller may control both the SOFC system 320 and the AOM 330.

UPS 340 may be configured to receive the DC input from the AOM 330. Alternatively UPS 340 may be configured to receive a DC output from SOFC system 320 directly. UPS 340 may include a DC/DC converter 340a and inverter 340b. Converter 340a may step up and/or step down the DC output voltage received from either AOM 330 or SOFC system 320. As shown in FIG. 3A, UPS 340 may provide the output of DC/DC converter 340a to an energy storage device 340c, such as a bank of supercapacitors, batteries, etc. The energy storage device 340c is referred to as a "battery" herein for brevity. The battery 340c may store the output from either AOM 330 or SOFC system 320 further use. The battery 340c may also supply power to load 350 via inverter 340b when, for example, SOFC system 320 is off-line or is outputting power lower than the requirements for load 350. Inverter 340b may convert a DC output from other parts of UPS 340 to AC output, so that it may be utilized by the AC load 350.

As shown in FIG. 3A, UPS 340 may also include a controller 340d. Controller 340d may be similar to controllers 320b and 330b, as described above in the context of SOFC system 320 and AOM 330 above, and may perform some similar functions as controllers 320b and 330b, as appropriate for UPS 340. In addition, as discussed in more detail below, controller 340d may communicate indirectly with other components, such as controller 320b, via parameters such as an output voltage of SOFC system 320. In one embodiment, the controller 340d does not directly communicate with the controllers 320b and/or 330b. For example, the controller 340d may be made by a different manufacturer than controller 320b and/or 330b such that they lack a common communication protocol or a direct data transfer wired or wireless connection.

Load 350 may include a number of suitable electronic devices that can draw power from an AC power supply, such as the UPS 340. Load 350 may include a "micro-grid," in the sense that load 350 may include a network of devices drawing power from fuel cell system 300 through the UPS 340. For example load 350 may include various computers or and/or servers, such as servers arranged in a server farm, electromechanical devices, lighting fixtures, climate control systems, etc. Generally, load 350 includes devices meant to draw power from SOFC system 320. Load 350 may also be optionally separately connected to other components (including the grid 301, alternative power supplies, batteries, etc.) so that it may draw power when SOFC system 320 is providing less power than required by load 350. In addition, as discussed above, load 350 may draw power from battery 340c of UPS 340 when SOFC system 320 is providing less power than required by load 350. In one embodiment, when UPS 340 is a microgrid AC power supply and controller which operates in an islanded configuration (i.e., where the UPS 340 and load 350 are not connected to the grid 301).

RLB 360 may include a number of suitable impedance imparting devices, including resistors, inductors, capacitors, and/or energy storage devices such as batteries or supercapacitors. For example, RLB 360 may include a number of resistive elements 360a shunted to ground 360b. In this or similar configurations, RLB 360 may allow the shunting to ground 360b of DC power produced by SOFC system 320 when the power demand by load 350 is less than the output power of SOFC system 320. This may allow SOFC system 320 operate at higher power and, therefore, higher for a more efficient and robust operation. This potential use of RLB 360 will be explained in more detail below.

As shown in FIG. 3A, RLB 360 may further include an energy storage device 360c, such as a battery or supercapacitor, which is referred to as a "battery 360c" for brevity herein. One purpose for battery 360c may be to store power delivered to RLB 360 via AOM 330. Power stored by battery 360c may be used, for example, to supplement power supplied to UPS 340 by SOFC system 320 when a power demand from load 350 exceeds a certain threshold, such as the maximum output power that can be provided by SOFC system 320 at any given time. In addition, as explained in more detail below, battery 360c may store power produced by SOFC system 320 when the output power exceeds a power demand by load 350.

An optional multi-way switch 370 may be located on the DC power bus 380 between the AOM 330, UPS 340, and RLB 360. The switch 370 may include switching elements, such as transistor(s), relay(s), contactor(s), etc. and an optional controller (i.e., logic). Alternatively, the switch 370 may be controlled by the UPS 340 controller 340d. The switch 370 may control current flow between the AOM 330 and one or both of UPS 340 and RLB 360, and current flow between the UPS 340 and the RLB 360.

Figure 3B:
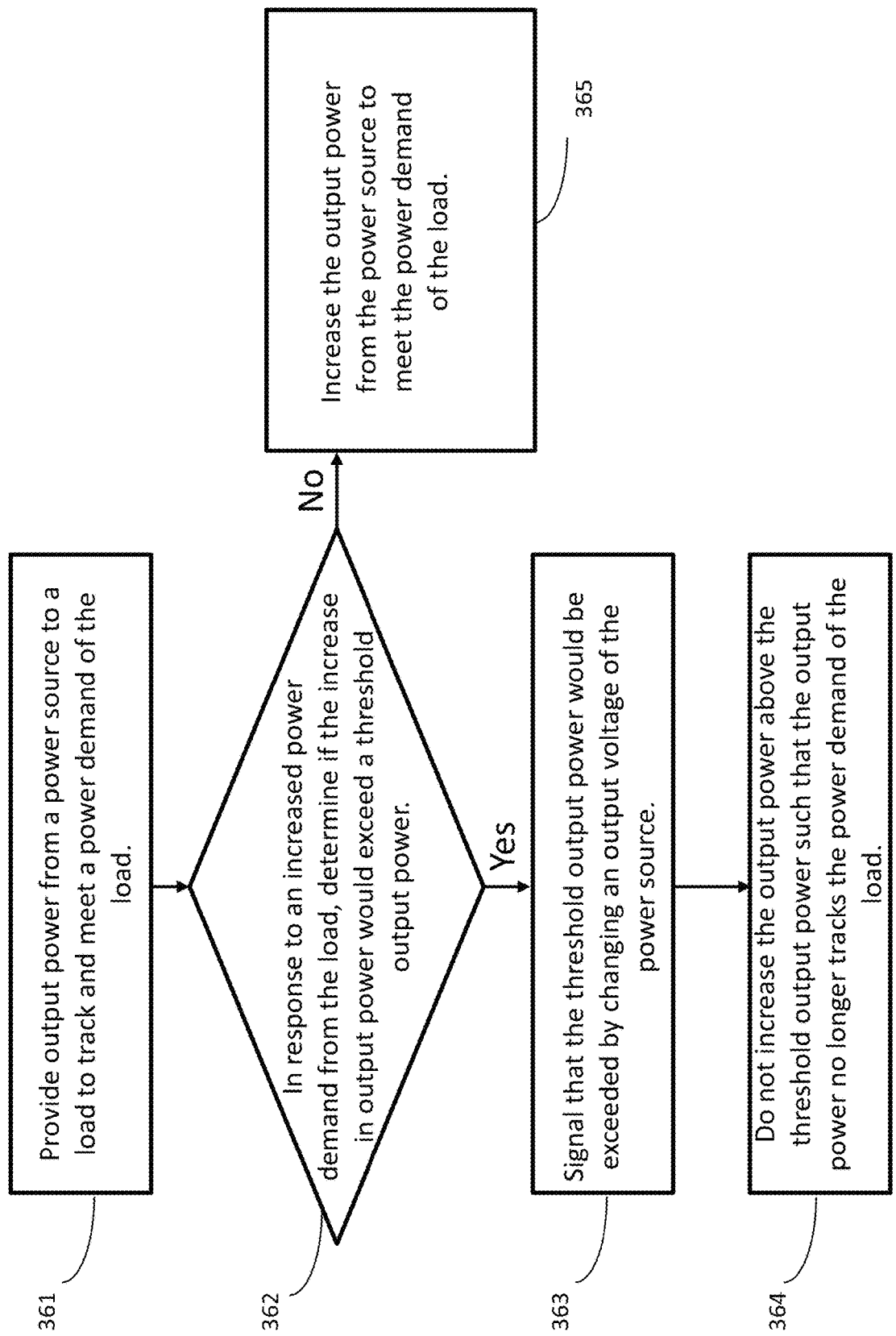
FIG. 3B is a flowchart of steps in an exemplary method for altering the output power of the system shown in FIG. 3A.

FIG. 3B shows steps in an exemplary method for controlling the output power of the system 300 shown in FIG. 3A. In step 361, output power is provided from a power source 320a to a load 350 to track and meet a power demand of the load. Any suitable power source may be used. For example, the power source 320a may be the SOFC system 320 which provides power to one or more devices in load 350 in order to meet a load power demand. As will be explained in more detail below, other devices may be relied upon to supply power at various steps including step 361. These other devices include, but are not limited to, batteries 340c and/or 360c. In any case, the power source 320a provides power in step 361 such that the power demand from load 350 is substantially met. In this step, as explained in more detail below, excess power may also be routed to power storage devices such as batteries 340c and/or 360c and/or the resistive elements 360a of the resistive load bank 360. Power stored in batteries 340c and/or 360c may be later used to supply power to load 350.

In step 362, in response to an increased power demand from the load 350, it is determined if the requested increase in output power of the power source 320a (e.g., of the SOFC system 320) which equals to the increased power demand would cause the output power of the power source to exceed a threshold output power. The threshold output power can be a maximum output power above which SOFC system 320 is not capable of providing more power at a given time (e.g., due to temporary lack of sufficient fuel flow or power which is above the maximum rated power of the SOFC system) or an output power above which the SOFC system 320 becomes less efficient or could become damaged. In one embodiment, the determination that the output power of the SOFC system 320 would reach the threshold output power is made by the SOFC system controller 320b. Other operating conditions that may be optionally detected and determined in step 362 include the temperature at which SOFC system 320 operates and/or the fuel flow rate into the SOFC system 320.

If it is determined that the requested increase in output power of the power source 320a (e.g., of the SOFC system 320) would exceed the threshold output power, then in step 363, the power source generates a signal that the threshold output power would be exceeded by changing an output voltage of the power source. For example, the SOFC system controller 320b changes the output voltage of the SOFC system 320 on the DC power bus 380 to signal to the UPS 340 controller 340d that the output power of the SOFC system 320 would exceed the threshold output power. For example, the signal can be a small decrease or increase in the output voltage of SOFC system 320 (a "droop"), rather than a direct communication between the SOFC system 320 controller 320b and UPS 340 controller 340d. For example, the droop can be a less than a 5% decrease or increase in output voltage, such as a 0.5 to 4.0%, including a 1 to 3%, decrease or increase in output voltage. Signaling using an output voltage can easily be detected by components downstream from SOFC system 320, such as the UPS 340 controller 340d, and has the advantage in that the signal can be detected and understood by a variety of different downstream components. In other words, no specific communication protocol or hardware need be used in order to implement the signal as the output voltage droop. As described in more detail below, this allows SOFC system 320 to communicate with components, such as the UPS 340, that have not been especially made or configured to directly communicate with SOFC system 320.

In step 364, the output power from power source 320a is not increased above the threshold output power such that the output power no longer tracks the power demand of the load 350 if it was determined in step 362 that the threshold output power would be exceeded. In this step 364, the SOFC system controller 320b stops increasing the output power of the SOFC system 320. The termination in the increase in output power of the SOFC system 320 above the threshold output power in step 364 results in the output power no longer tracking the power demand of load 350. For example, the output power may be set in step 364 to a constant value that equals the threshold output power of SOFC system 320. As discussed in more detail below, this output power setting may enable the SOFC system 320 to operate more efficiently and with less potential for long-term damage. The excess power to satisfy the load 350 power demand can be provided from the energy storage devices 340c and/or 360c (e.g., in an islanded or grid connected configuration) and/or from the grid 301 (e.g., in the grid connected configuration) by the UPS controller 340d in response to receiving the signal in step 363. For example, in response to receiving the signal from the SOFC controller 320b (i.e., the change in output voltage from the SOFC system 320), the UPS controller 340d may change the setting of the switch 370 to allow additional power (i.e., current) to flow from the batteries 340c and/or 360c through the UPS 340 to the load 350.

In contrast, if it is determined in step 362 that the increase in output power of the power source 320a (e.g., of the SOFC system 320) would not exceed a threshold output power, then the output power from the power source is increased to meet the power demand of the load 350. For example, if the UPS controller 340d does not detect the change in output voltage of the SOFC system 320 (i.e., if the SOFC system controller 320b determines that meeting the load power demand would not exceed the threshold output voltage and does not generate the signal), then the SOFC controller 320b increases the output power of the SOFC system 320 to meet the load power demand and the UPS controller 340d draws the increased output power from the SOFC system 320 to track and meet the load 350 power demand.

Figure 4D:
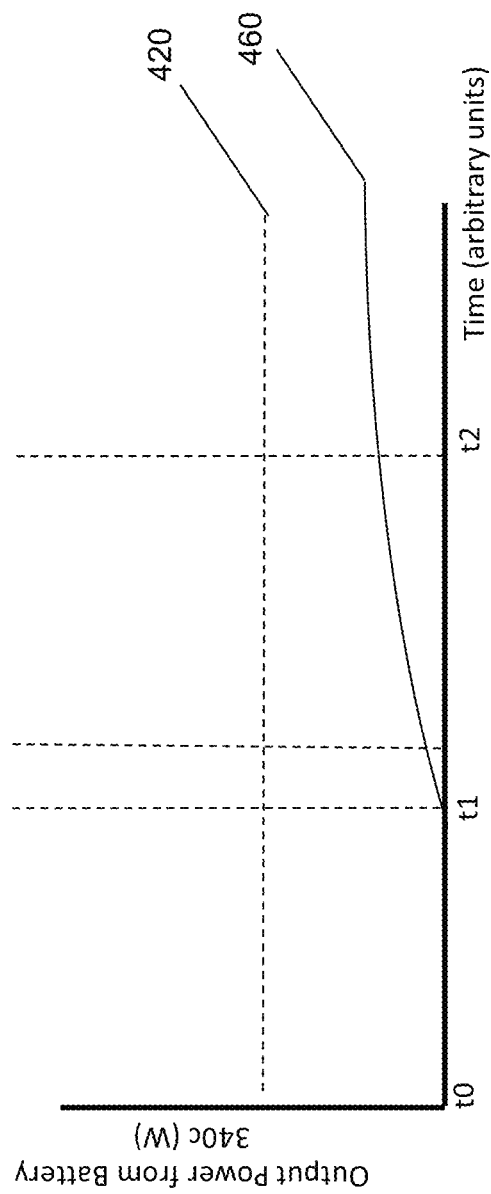

FIGS. 4A-4D show certain aspects of system 300 in operation according to embodiments. Specifically, FIG. 4A shows the load power demand (in Watts) 410 exerted by load 350 on SOFC system 320 versus time. FIG. 4B shows the power output (in Watts) from SOFC system 320 over the same time period. FIG. 4C shows the output voltage of SOFC system 320 over the same time period.

Both FIGS. 4A and 4B show the load 350 power demand 410 provided by the load 350 to the SOFC system 320. For example, in the embodiment shown in FIGS. 4A and 4B, threshold output power 420 may be, for example, a threshold indicative of a user imposed constraints or operating conditions. For example, threshold output power 420 may correspond to the highest power at which a desired efficiency and/or operating temperature of the SOFC system 320 is achieved and/or the highest power at which SOFC system 320 damage is avoided. As another example, threshold output power 420 may relate to an output power corresponding to a desired fuel utilization by SOFC system 320. Alternatively, as will be described in more detail below with respect to additional embodiments, the threshold output power 420 may be, for example, a maximum possible output power of the SOFC system 320 at a given time. For example, the threshold output power 420 may be the maximum output power of the SOFC system when the load power demand 410 increases at a high rate such that the SOFC system temporarily cannot meet the increased load power demand 410 because the SOFC system 320 cannot ramp up the output power 430 at the corresponding sufficiently high rate. For example, the SOFC system 320 may not be able to ramp up the output power 430 at the sufficiently high rate due to temporary lack of sufficient fuel flow, since it takes a certain amount of time to sufficiently increase the fuel flow rate to the SOFC system 320 to achieve the output power 430 demanded by the load 350. Alternatively, the threshold output power 420 may be the maximum rated power of the SOFC system 320.

As shown in FIG. 4B, SOFC system 320 output power 430 reaches threshold output power 420 at a time t1. Before time t1, i.e., between time t0 and time t1, SOFC system 320 output power 430 tracks and meets the load 350 power demand 410. In other words, SOFC system 320 supplies all the power according to the requirements of load 350. FIGS. 4A and 4B show load power demand 410 continues to increase beyond threshold output power 420 from time t1 to time t2. However, once the load 350 power demand 410 reaches the threshold output power 420, the SOFC system 320 may be operating at a maximum safe, desired and/or possible output power. Although SOFC system 320 may be configured to output even more power than threshold output power 420, doing so may damage the system 320 and/or degrade its efficiency. Therefore, at time t1, it may be advantageous to prevent or stop the output power 430 from increasing even though, as shown in FIG. 4A, the load power demand 410 continues to increase.

One response, as shown in FIG. 4B, is to maintain the output power 430 of SOFC system 320 at the threshold output power 420 from time t1 to time t2, regardless of the increase in load power demand 410. Maintaining this condition supplies load 350 with the threshold output power 420. The output power 430 of the SOFC system may be maintained at the threshold output power 420 by the SOFC system controller 320b to stop the output power 430 from following the increasing load power demand 410. In other words, if the output power 430 was already equal to the threshold output power 420 before the increase in the load power demand 410, then the SOFC system controller 320b does not increase the output power 430. If the output power 430 was below the threshold output power 420 before the increase in the load power demand 410, then the SOFC system controller 320b only increases the output power 430 to equal the threshold output power 420, but does not increase the output power 430 above the threshold output power 420.

FIG. 4C shows that the SOFC controller 320b changes the output voltage 440 of the SOFC system 320 to signal to the UPS controller 340d that the threshold output power 420 would be exceeded if the load power demand 410 is met. As shown in FIG. 4C, the output voltage 440 of SOFC system 320 is maintained at an initial voltage V1 from time t0 until time t1, when the output power 430 reaches threshold output power 420. At time t1, SOFC system 320 signals that threshold output power 420 would be exceeded by slightly decreasing output voltage 440. This decrease may be called a "voltage droop" 450 and may occur over time Δt (e.g., over 0.1 seconds to 10 seconds), as shown in FIG. 4C. Droop 450 can be detected by UPS 340 and/or by other components. In particular, UPS 340 controller 340d may detect the droop 450 and may respond to the detection of droop 450 by leveling off the power output 430 it receives from SOFC system 320, thus applying less power from the SOFC system 320 to load 350 than the load power demand 410. In other words, the droop 450 signals reaching and maintaining output power 430 at threshold output power 420, potentially causing other components of system 300 to supply supplemental power to UPS 340.

As shown in FIG. 4C, droop 450 is generally the difference between a steady state voltage V1 output by SOFC system 320 from time t0 to time t1 and a lower voltage V2 applied from t1 onward. Droop 450 may be fixed percentage of V1, for example less than 5% of V1, such as 0.5% to 4%, or 1% to 3% of V1. Generally, it can be advantageous for droop 450 to represent a large enough change in output voltage 440 to be detected by controller 340d. At the same time, it may be advantageous for droop 450 to be small enough in magnitude to be acceptable by the load 350 operating specification and to result in relatively insubstantial change to the output power 430 of SOFC system 320 such that the operation of other components (e.g., UPS 340 or devices in load 350) are not substantially affected by the change in output voltage. In some embodiments it may be advantageous for droop 450 to be substantially less than 5% of V1 (e.g., 3% or less). Droop 450 can be chosen to best fit the particular application and the sensitivity of the various components involved (e.g., UPS 340 controller 340d). Droop 450 can alternatively be chosen for more general applications allowing increased flexibility to use SOFC system 320 with a variety of different components, such as UPS 340, with different specifications and made by different manufacturers without the express aim of being compatible with SOFC system 320.

Advantages of using a voltage droop 450 over other means of communication (e.g., wired or wireless communication) between SOFC system 320 and UPS 340, include that it does not require particular circuitry, connection, or communication protocol between controller 320b and controller 340d. In other words, communication by voltage droop 450 does not require special hardware or communication protocols to allow controller 320b to communicate a change in output power 430 to other components, including controller 340d. Instead, controller 340d need only be configured such that it interprets droop 450 as a signal indicative of changing power output. Is to be understood that droop 450 may signal other changes in the performance or operation of the system 300 than a change in output power 430, as shown in FIG. 4B. For example, droop 450 may signal the controller 340d to trigger battery 360c and/or 340d to supply supplemental power to load 350, and for the switch 370 to provide a current path between the battery 360c and the load 350.

FIG. 4D shows use of droop 450 to optionally trigger at least one energy storage device (e.g., battery 340c and/or 360c) to supply supplemental power 460 to load 350. In the example shown in FIG. 4D, the output power of the one or more battery supplements the output power from SOFC system 320 so that the total power supplied to the load 350 (i.e., the sum of the power supplied by at least one battery and SOFC system 320) is substantially equal to the load power demand 410. It is to be understood that this arrangement is merely exemplary. Droop 450 may trigger supplemental power from the least one battery of any magnitude. For example, droop 450 may trigger supplemental power from the at least one battery that is proportional to power output 430 of SOFC system 320 or to load power demand 410. Although FIG. 4D shows a single droop 450 effecting a single change in the supplemental power 460, it is to be understood that multiple droops are possible. In some arrangements, it may be advantageous to use multiple droops to trigger a stepwise change in the supplemental power 460 output by the at least one battery 340c and/or 360c. Although FIG. 4D shows control of one or more battery via droop 450, it is to be understood that droop 450 may be used in the way shown to control the provision of supplemental power from any other suitable supplemental power source (e.g., the grid 301, a supplemental power generator, such as a diesel generator, etc.).

The UPS 340 can be operated in three modes. In the first mode, the UPS 340 controller stops increasing power to the load 350 when it detects a droop 450 of any magnitude. In the second mode, the SOFC system controller 320b can output a gradient droop (i.e., a varying magnitude droop) 450 to signal that the SOFC system 320 can provide an output power 430 increase to the UPS 340 and load 350 that is inversely proportional to the absolute magnitude of the droop 450. In this mode, the gradient droop 450 is used to signal the UPS controller 340d that the SOFC system 320 is either approaching the threshold output power 420 or that the SOFC system 320 cannot keep up with the increase in load power demand 410. The UPS 340 provides the increased output power 430 to the load 350 that does not exceed the threshold output power 420 and that only partially meets the load power demand 410. In the third mode, the UPS controller 340d provides a given amount of supplemental power from one or more batteries 340c and/or 360c to the load 350 based on the magnitude of the gradient droop 450 described above for the second mode. For example, based on the larger or smaller the absolute magnitude of the droop 450 detected by the UPS controller 340d, the UPS controller 340d applies a respective larger or smaller amount of supplemental power 460 output from the at least one battery to the load 350 to completely meet the load power demand 410.

Still other uses for droop 450 may be implemented. For example, droop 450 may alternatively indicate to controller 340d that interruption in power from SOFC system 320 is imminent. Droop 450 may alternatively also indicate to controller 340d that a decrease in power from SOFC system 320 is imminent. Controlling the UPS 340 based on droop 450 allows the UPS 340 to draw supplemental power 460 as long as the controller 340d can issue a command based on the significance of droop 450. The significance or meaning of droop 450 may also be altered by a user or administrator by reprogramming controller 340d. In this way, the signaling via droop 450 shown in FIG. 4C allows SOFC system 320 to be used with a variety inverters, such as the UPS 340 that are not configured to be in direct data and information communication with the SOFC system 320. It is to be understood that other variations in the information conveyed by droop 450 are encompassed by the embodiments described herein.

Figure 5:
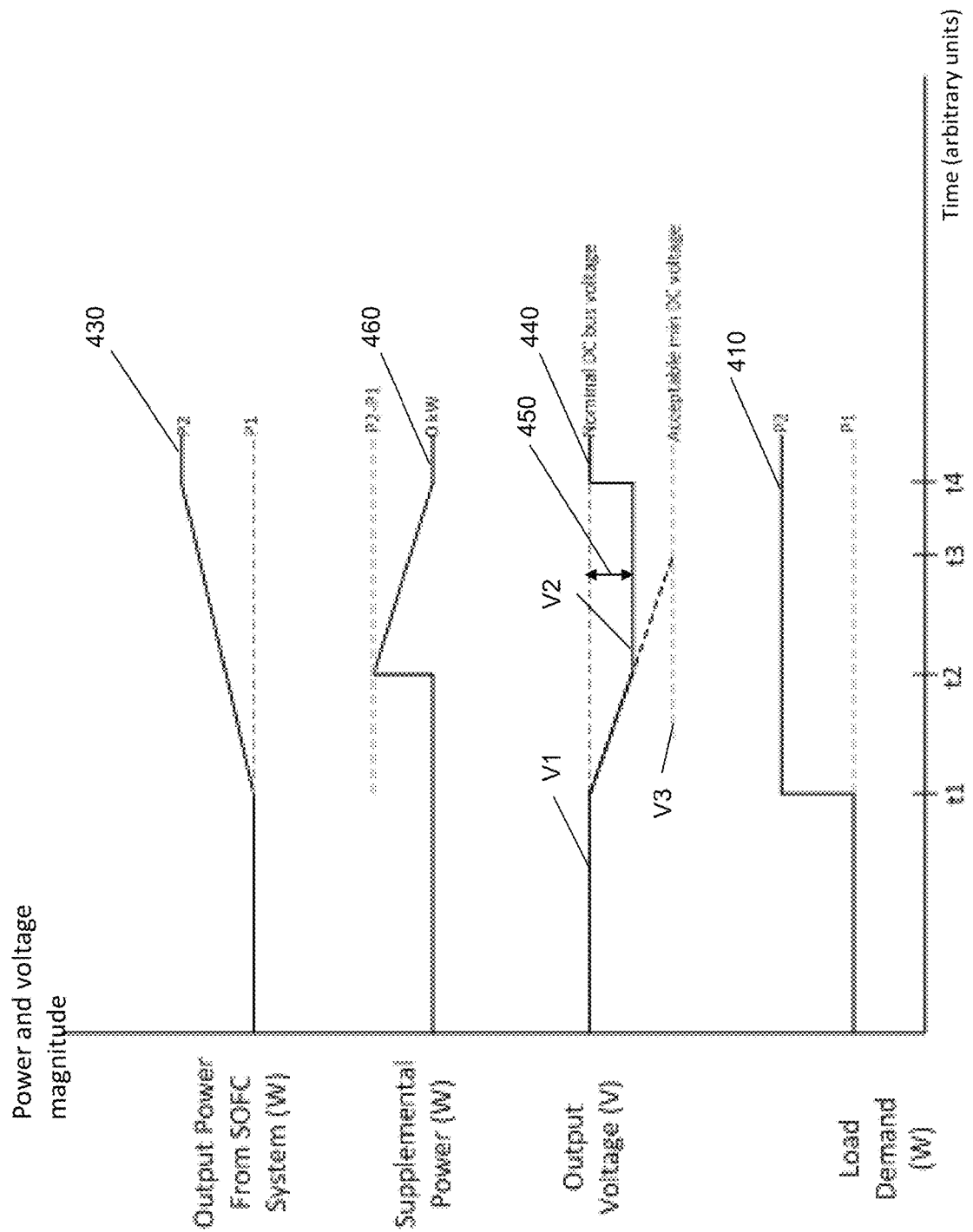
FIG. 5 shows temporal plot of certain aspects of the system of FIG. 3A in operation according to another embodiment.

FIG. 5 illustrates an alternative embodiment in which the threshold output power 430 may be the maximum power output of the SOFC system 320, such as when the load power demand 410 increases at a high rate such that the SOFC system temporarily cannot meet the increased load power demand 410 because the SOFC system 320 cannot ramp up the output power 430 at the corresponding sufficiently high rate. For example, as described above, the SOFC system 320 may not be able to ramp up the output power 430 at the sufficiently high rate due to temporary lack of sufficient fuel flow, since it takes a certain amount of time to sufficiently increase the fuel flow rate to the SOFC system 320 to achieve the output power 430 demanded by the load 350. The y-axis in FIG. 5 is a magnitude of power or voltage, while the x-axis is time.

In the embodiment shown in FIG. 5, at time t1, the load 350 power demand 410 experiences a high rate spike from power P1 to power P2. In response, the SOFC system 320 begins to increase the output power 430 at time t1. However, the output power 430 is ramped up gradually (e.g., due to the delay in increasing the fuel flow rate and/or other operating characteristics of the SOFC system 320) from initial output power P1 to demanded power P2. Thus, the output power 430 does not reach the demanded power P2 until time t4. At the same time t1, the SOFC system 320 controller 320b sends a signal to the UPS controller 340d that the SOFC system 320 output power 430 cannot track and meet the load power demand 410 at this time t1. In other words, the controller 320b decreases the output voltage 440 provided by the SOFC system 320 on the DC power bus 380 connecting the SOFC system 320 and the UPS 340 to signal that the SOFC system 320 cannot provide output power which equals to load power demand value P2.

As shown in FIG. 5, the controller 320b may provide a gradient droop 450 to the UPS 340 which gradually decreases to signal that the SOFC system 320 output power 430 will be increasing gradually at a corresponding rate. For example, the output voltage may decrease from a steady stage voltage value V1 to a lower value. After decreasing at a given rate (e.g., slope) from time t1 to time t2 (which is less than time t4), the output voltage 440 may level off at a constant value V2 at time t2. The constant value V2 of the output voltage 440 is lower than value V1, but is higher than the acceptable minimum DC voltage value V3 that is specified for the DC power bus 380. For example, V3>0.95*V1, and V1>V2>V3. Thus, the droop 450 changes from gradient value (i.e., variable value between V1 and V2) to a constant value V2 at time t2. The slope and maximum value of the gradient droop may indicate the specific value of the supplemental power 460 that should be provided to supplement the SOFC system 320 output power 430 over a given time to meet the load power demand 410. The start of constant value of the droop 450 at time t2 may signal the UPS controller 430d that the information about the output power 430 ramp is completed, and that the UPS controller 430d should begin drawing the supplemental power 460 at time t2. Thus, the system operates in the third mode described above.

In response to receiving the signal (i.e., detecting the droop 450 on the DC power bus 380), the UPS controller 430d begins at time t2 to draw supplemental power 460 from at least one energy storage device (e.g., battery 440c and/or 460c) and/or from another source, such as from the grid 301 and/or from a backup power source, such as a generator. As shown in FIG. 5, the initial value of the supplemental power 460 drawn is spiked from zero kW to a value of P2 minus P1 to meet the load power demand 410 at time t2. The amount of supplemental power 460 drawn by the UPS 340 is inversely proportional to the amount of output power 430 from the SOFC system 320. In other words, as the output power 430 from the SOFC system 320 increases from value P1 to value P2 (which is reached at time t4), the supplemental power 460 decreases from value (P2-P1) at time t2 to an intermediate value at time 6t3 to zero kW at time t4.

Once the output power 430 of the SOFC system 320 reaches value P2 of the power demand 410 at time t4, the SOFC system controller 320b terminates the droop 450. In other words, the controller 320b increases the output voltage 440 of the SOFC system 320 from the constant droop value V2 back to the initial value V1. Upon detecting the termination of the droop 450, the UPS controller 430d stops drawing the supplemental power 460 at time t4. After time t4, the output power 430 from the SOFC system 320 tracks and meets the load 350 power demand 410 by supplying the demanded power value P2 to the load 350 through the UPS 340.

Thus, in this embodiment, the signaling between the power source 320a and the downstream device (e.g., UPS 340) is managed by changing the voltage output of the power source 320a. The distribution of power generated by the SOFC system 320 on the DC power bus 380 between the DC output and the AC output can be controlled in an islanded or grid parallel operation. Furthermore, the output power delivered to the DC power bus 380 can be controlled redundantly through the various inverters 310a and 340a by adding resistive loads 360a on the DC output of the SOFC system 320.

FIGS. 6A-6C illustrate another embodiment in which the output power 730 of a power source 320a, such as the SOFC system or another power source described above, is maintained at or above a minimum desired operating power 720 even after the load 350 power demand 710 drops below the minimum desired operating power 720. The minimum desired operating power 720 may correspond to an output power below which the temperature of the SOFC system 320 becomes so low that the output efficiency of SOFC system 320 is degraded. That is, below the minimum desired operating power 720, the efficiency of SOFC system 320 is less than desired, for example, is at least 20% below optimal efficiency. Operating SOFC system 320 at such temperatures may cause damage to SOFC system 320 degrading its long-term performance. Therefore, it may be advantageous to maintain the output power 730 of SOFC system 320 above minimum desired operating power 720 even after the load 350 power demand 710 drops below the minimum desired operating power 720.

In one embodiment shown in FIG. 6A, the load 350 power demand 710 may be above the minimum desired operating power 720 and below the threshold output power 420 of the SOFC system 320. For example, the load 350 power demand 710 may reach a maximum value at time $t_{max}$ and then decrease. The load power demand 710 may drop below the minimum desired operating power 720 of SOFC system 320 at time t1.

In response to the load power demand 710 dropping below the minimum operation power 720 at time t1, a portion or all of the output power 730 of the SOFC system 320 is directed to the RLB 360 through the auxiliary DC power bus 390 to maintain the total output power 730 of the SOFC system 320 at or above the minimum desired operating power 720, as shown in FIG. 6B. For example, if the load power demand 710 drops to zero, then all of the output power 730 is directed to the RLB 360 through bus 390. If the load power demand 710 drops to a value above zero and below the minimum desired operating power 720, then a portion of the output power 730 is directed to the load 350 through the DC power bus 380 and the UPS 340 to meet and track the load power demand 710, while an excess portion of the output power 730 is directed to the RLB 360 via the auxiliary DC power bus 390.

The output power 730 may be split between the UPS 430 and the RLB 460 by the switch 370. The switch 370 may be controlled by any suitable controller, such as the SOFC system 320 controller 320b, the UPS 430 controller 430d and/or a dedicated switch 370 controller.

In one embodiment shown in FIG. 6C, if the switch 730 is controlled by the UPS 430 controller 430d and/or the dedicated switch 370 controller, then the SOFC system 320 controller 320b can change the output voltage 440 (i.e., to create a voltage droop 450) on the DC power bus 380 to signal the UPS 430 controller 430d and/or the dedicated switch 370 controller to direct all or a portion of the output power 730 to the RLB 360. Similar to the prior embodiment, a gradient droop 450 may be used and the slope and maximum value of the gradient droop may indicate the specific value or portion of the total output power 730 that should be directed to the RLB 360 by the switch 370 via bus 390.

Although FIG. 6B shows the output power 730 of SOFC system 320 ramping up to its threshold output power 420, is to be understood that the output power may be maintained at other levels between the minimum desired operating power 720 and the threshold output power 420 in this embodiment. For example, it may be advantageous to increase output power 730 from SOFC system 320 to a level at which the SOFC system 320 is operating more efficiently than it would be at the minimum desired operating power 720. Generally, this output power 730 corresponds to a relatively high operating temperature of SOFC system 320 (e.g., above 700° C., such as 800 to 850° C. as discussed above). Thus, in this embodiment, the SOFC system 320 temperature is maintained in the desired operating range (e.g., above 700° C., such as 800 to 850° C.) by maintaining the output power 730 above the load power demand 710 and directing the excess portion of the output power 730 that is higher than the load power demand 710 to the RLB 360. Thus, the direction of power to the RLS 360 can be managed such that the load steps on the SOFC system 320 can be minimized, and a sufficient load on the SOFC system 320 can be maintained to maintain the SOFC system 320 within a desired temperature range. Furthermore, the direction of excess power to the RLB 360 manages the overvoltage on the DC power bus 830 by preventing power flow back from the load 350 into the SOFC system 320.

FIGS. 7A-7C show another configuration according to another embodiment. FIG. 7A shows the load demand 810 as experienced by SOFC system 320 via the UPS 340. FIG. 7B shows the output power 830 from the SOFC system 320 to the UPS 340. FIG. 7C shows the excess output power 832 from the SOFC system 320 to the RLB 360. The total output power 730 shown in FIG. 6B of the previous embodiment corresponds to the sum of the output power 830 to the UPS 340 and the excess output power 832 to the RLB 360.

As shown in FIGS. 7A and 7B, the output power 830 to UPS 340 tracks and meets the load power demand 810 so that load 350 is fully powered by the SOFC system 320 from time t0 to time t2. FIGS. 7A and 7B also show that from time t0 to time t1, both the load power demand 810 and the output power 830 to UPS 340 are less than the threshold output power 420 of the SOFC system 320. Thus, the sum of output powers 830 and 832 is also less than the threshold output power 420. When the output power 830 increases by a given amount, the excess output power 832 decreases by a corresponding amount to keep the total output power 730 (e.g., the sum of output powers 830 and 832) of the SOFC system 320 constant with time.

As shown in FIG. 7A, the load power demand 810 increases sharply at t1 and can for example reach the threshold output power 420 of the SOFC system 320 shortly thereafter. As discussed above with respect to FIG. 5, the SOFC system 320 typically takes a longer time to provide a corresponding increase in output power 830 to the load 350 than the spike in the load power demand 810. This can leave the load power demand 810 unsatisfied for a period of time. In the prior art, an auxiliary power is typically provided from an energy storage device or the grid to bridge the temporary output power shortage. This involves additional process complexity.

In the present embodiment shown in FIG. 7C, all or a portion of the excess output power 832 that was directed to the RLB 360 is redirected to the load 350 through the UPS 340 to meet the load power demand 810. Thus, bridging auxiliary power from the energy storage device and/or the grid 301 is not required to meet the spike the load power demand 810. The UPS controller 340d may direct the excess output power 832 from the RLB 360 to the load 350 by controlling the switch 370. The output power 832 to the RLB 360 can be decreased to zero as shown in FIG. 7C or remain above zero, depending on the amount of power needed to meet and track the load power demand 810.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A power generation system, comprising a power source that is configured to communicate with at least one of a downstream load or a downstream device by changing a voltage on a power bus between the power source and the at least one of the downstream load or the downstream device, while power source provides power on the power bus to the at least one of the downstream load or the downstream device.

2. The power generation system of claim 1, wherein:
the power source comprises a DC power source having a power source controller;
the power bus comprises a DC power bus;
the device comprises an inverter containing device containing an inverter controller; and
the inverter controller is a separate device from the power source controller such that there is no separate communication link or communication protocol between the inverter controller and the power source controller.

3. The device of claim 2, wherein:
the power source controller is configured to determine if an increase in output power of the power source which equals to an increased power demand from a load would cause the output power of the power source to exceed a threshold output power in response to the increased power demand from the load;
the power source controller is configured to communicate to the inverter controller that the threshold output power would be exceeded by changing the output voltage of the power source, and not increasing the output power above the threshold output power such that the output power no longer tracks the power demand of the load if the output power of the power source would exceed the threshold output power; and
the power source controller is configured to increase the output power from the power source to meet the power demand of the load if the output power of the power source would not exceed the threshold output power.

4. The device of claim 3, wherein:
the load comprises a microgrid;
the device comprises an uninterruptable power system containing an energy storage device; and
the power source comprises a solid oxide fuel cell (SOFC) system.

* * * * *